(No Model.)
A. WANNER, Jr.
METAL FRAMED MIRROR.
No. 532,928. Patented Jan. 22, 1895.
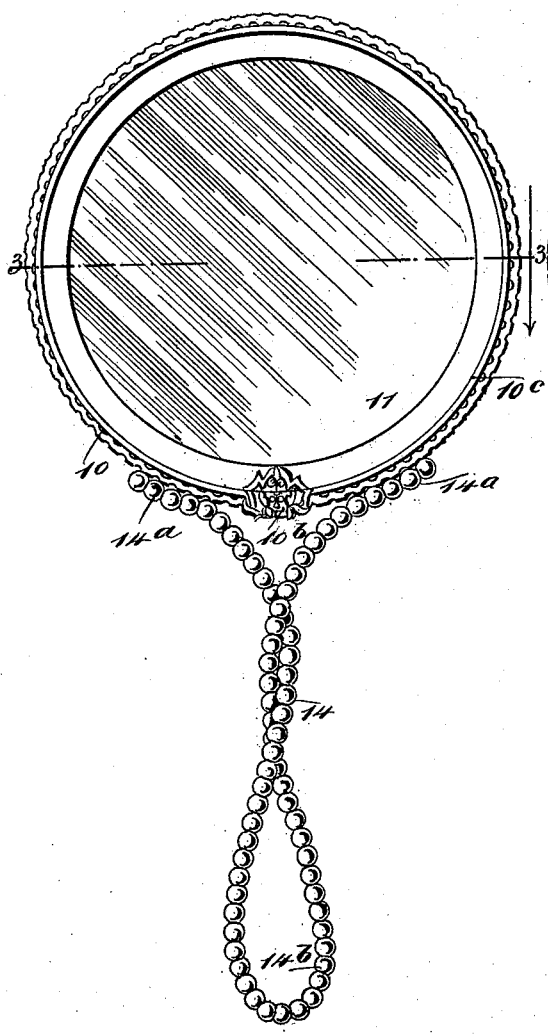
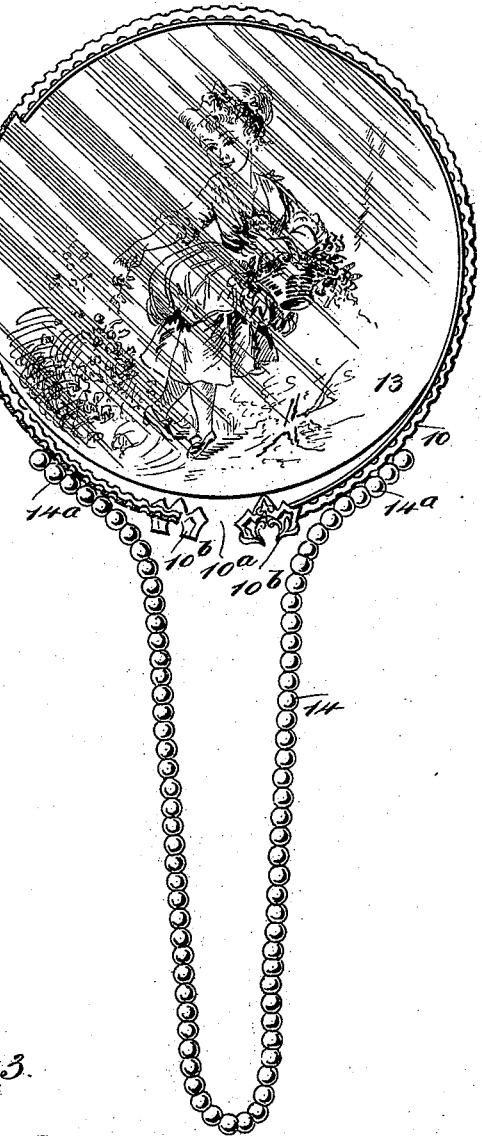
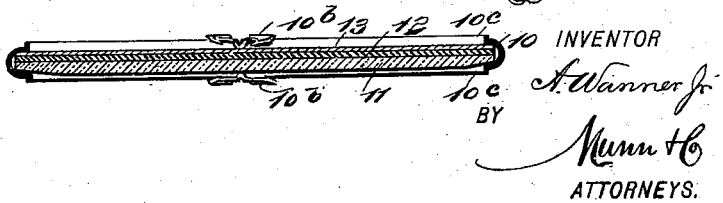
WITNESSES:
INVENTOR
A. Wanner Jr.
BY
Munn & Co.
ATTORNEYS.

UNITED STATES PATENT OFFICE.

ALBERT WANNER, JR., OF HOBOKEN, NEW JERSEY.

METAL-FRAMED MIRROR.

SPECIFICATION forming part of Letters Patent No. 532,928, dated January 22, 1895.

Application filed March 27, 1894. Serial No. 505,274. (No model.)

*To all whom it may concern:*

Be it known that I, ALBERT WANNER, Jr., of Hoboken, in the county of Hudson and State of New Jersey, have invented new and useful Improvements in Metal-Framed Mirrors, of which the following is a full, clear, and exact description.

My invention relates to improvements in metal framed mirrors, and more particularly to those supplied for toilet use, having handles for their convenient manipulation.

The objects of my invention are, to provide a preferably circular mirror with a frame, and a handle that is so constructed and attached to the frame, that it will be adapted to contract the frame upon the mirror glass and its backing, to retain it in place within said frame.

A further object is to provide an ornamental reverse facing piece for the mirror, which will add to its beauty and serve to cushion the mirror glass against injury by percussion, and also to furnish a transparent non-fragile back piece as a protection to the cushion piece.
To these ends my invention consists in the peculiar construction and combination of parts, as is hereinafter described and indicated in the claims.

Reference is to be had to the accompanying drawings, forming a part of this specification, in which similar figures of reference indicate corresponding parts in all the views shown.

Figure 1 is a front view of a hand mirror having the improved frame. Fig. 2 is a reverse view of the device, showing the frame broken away and severed, and the handle portion in incomplete form; and Fig. 3 is a transverse sectional view on the line 3—3 in Fig. 1.
The frame 10 is preferably produced from sheet metal, that is bent into ring form of a proper diameter to embrace the periphery of the circular mirror 11, when said frame is completed. As indicated, the said frame 10, comprises a sheet metal strip, which is pressed or rolled into a shape that is substantially semi-circular in cross section, and at the same time is given a hoop form having its ends slightly separated as shown at 10$^a$ in Fig. 2, the ornamental joint cover pieces 10$^b$ being secured on the ends of the frame piece at opposite sides.

The mirror 11 may be of plate glass that is bevel edged as shown in Figs. 1 and 3, and is so proportioned in diameter that it will freely enter the semi-circular channel of the frame strip when the latter is in the condition shown in Fig. 1.

An ornamental reverse facing piece 12, is imposed on the silvering of the mirror 11, which it is designed to protect, consisting of a heavy paper sheet that is embellished by an engraving or lithographic picture, which may be tinted in several colors, or be produced in black on white paper, as may be preferred. The back proper consists of a thin transparent non-fragile disk 13 which is imposed on the paper sheet 12, it being preferably composed of celluloid that is sufficiently lucid to clearly expose the picture it covers.

A handle piece 14 is a feature of the invention, and consists of a metallic bar preferably made to simulate a series of strung beads.

In the initial stage of construction of the mirror, the handle piece is bent into a looped form, and out-curved at the ends, which are affixed to the perimeter of the frame piece 10, as represented at 14$^a$ in Figs. 1 and 2.

When the parts composing the complete mirror are to be assembled, the glass, paper-cushion piece, and transparent back piece are introduced as shown in Figs. 2 and 3, all having their circular edges inserted in the circumferential recess or channel of the frame piece 10, the latter having an out-turned bezel edge 10$^c$ formed on each side to afford a neat finish and protect the glass 11 and back piece 13, from abrasion when the device is laid on either side. After the parts are in position the handle piece 14 is twisted so that its loop members will be spirally wrapped upon each other as shown in Fig. 1, which will produce an ornate handle, provide a hanger eye 14$^b$ at the outer end of said handle, and at the same time draw the ends of the frame strip 10 together, thus completing its circular form and loosely securing the parts within it that have been mentioned, as shown in Fig. 1. When the ends of the frame piece 10 are caused to impinge, the joint cover pieces 10$^b$ are drawn into position directly opposite each other and conceal the joint 10$^a$, their ornamental shape adding to the ornate appearance of the frame, which may be exteriorly chased, or otherwise embellished as may be preferred.

The provision of the single cut frame 10, and its manner of construction, avoids soldering parts together to produce a frame, and permits the production of a light, strong frame from sheet metal.

By placing the thick card board piece 12 over the silvering of the mirror glass 11, the smooth and slightly elastic cushion thus provided serves to protect the silvering from abrasion and the glass from fracture, said piece by its ornamentation on the rear surface which is rendered visible by the use of the transparent back piece 13, giving a beautiful and chaste appearance to the reverse side of the mirror, the non-fragile quality of the transparent back piece conducing to the durability of the improved metal framed mirror.

Having thus fully described my invention, I claim as new and desire to secure by Letters Patent—

1. In a metal framed mirror, a frame consisting of a divided band provided with a handle having its arms separated adjacent to the band and secured to the latter a short distance from the opposed ends of the same, the said ends thus extending toward each other between the separated ends of the handle, and the band further being held strained in contracted form by the handle arms, the said arms being held against separation, substantially as described.

2. In a metal framed mirror, a frame consisting of a divided band, U-shaped in cross section for receiving the mirror, and provided with a handle having arms that diverge adjacent to the band and secured to the band a distance from the opposed ends of the latter, the said ends thus extending toward each other between the diverging arms and held strained in contracted form by the handle arms, the said arms having a twist and maintaining the meeting ends of the band against separation, substantially as described.

ALBERT WANNER, JR.

Witnesses:
C. SEDGWICK,
F. W. HANAFORD.